United States Patent [19]
Juengel

[11] Patent Number: 4,843,640
[45] Date of Patent: Jun. 27, 1989

[54] INDUSTRIAL IDENTIFICATION TRANSPONDER

[75] Inventor: Richard O. Juengel, Romeo, Mich.
[73] Assignee: GTE Valeron Corporation, Troy, Mich.
[21] Appl. No.: 855,415
[22] Filed: Apr. 24, 1986
[51] Int. Cl.$^4$ ............................................. H04B 9/00
[52] U.S. Cl. ............................. 455/604; 340/825.54; 455/603; 455/606; 455/607
[58] Field of Search ............... 455/604, 605, 606, 607, 455/603; 340/825.54, 825.23, 825.72

[56] References Cited

U.S. PATENT DOCUMENTS

| | | | |
|---|---|---|---|
| 3,377,616 | 4/1968 | Auer | 455/604 |
| 3,713,148 | 2/1973 | Cardullo et al. | 343/6.5 R |
| 3,745,569 | 7/1973 | Works et al. | 342/44 |
| 4,011,551 | 3/1977 | Adler | 340/189 M |
| 4,025,791 | 5/1977 | Lennington et al. | 342/44 |
| 4,119,948 | 10/1978 | Ward et al. | 340/151 |
| 4,150,284 | 4/1979 | Trenkler et al. | 455/617 |
| 4,325,146 | 4/1982 | Lennington | 455/608 |
| 4,328,623 | 5/1982 | Juengel et al. | 33/174 L |
| 4,330,870 | 5/1982 | Arends | 455/617 |
| 4,401,945 | 8/1983 | Juengel | 324/207 |
| 4,437,240 | 3/1984 | Juengel et al. | 33/172 E |
| 4,479,446 | 10/1984 | Johnson et al. | 112/121.12 |
| 4,509,266 | 4/1985 | Cusack | 33/174 L |
| 4,514,731 | 4/1985 | Flack et al. | 340/825.54 |
| 4,545,106 | 10/1985 | Juengel | 29/563 |
| 4,578,874 | 4/1986 | Juengel | 33/561 |
| 4,588,880 | 5/1986 | Hesser | 235/376 |
| 4,608,714 | 8/1986 | Juengel | 455/603 |

FOREIGN PATENT DOCUMENTS

| | | |
|---|---|---|
| 1128132 | 7/1982 | Canada. |
| 413808 | 6/1980 | Sweden. |
| 2007355 | 5/1979 | United Kingdom. |

OTHER PUBLICATIONS

U.S. Ser. No. 814,464 filed Dec. 30, 1985 by Juengel.
U.S. Ser. No. 890,187 filed Jul. 25, 1986 by Juengel.
"Data Input Link Goes Infrared for Process-Control Applications", *Electronics,* Dec. 20, 1979, pp. 60 and 62.
Renshaw brochure "Optical Transmission for Touch Trigger Probes".
LP2 Probe System trade literature; 2 pages; Renishaw Electrical Limited.
Prototype Performance Specification Number ROS 13—Optically Coupled Probe (OMP/OMM); 24 pages; Renshaw-Electrical Lmited.

*Primary Examiner*—Robert L. Griffin
*Assistant Examiner*—Leslie Van Beek
*Attorney, Agent, or Firm*—Harness, Dickey & Pierce

[57] ABSTRACT

This invention relates to a digital communication circuit which is particularly adapted to be used in factories employing flexible machining systems where pallets supporting workpieces are moved from one work station to another. An identification transponder in accordance with this invention is powered by a battery supply and travels on the pallet. Once the pallet is in close proximity to a work station, a flash of light is provided by an interrogator which is received by a transponder. The transponder is then activated to transmit a light signal modulated by a stored binary coded identification word which is received by the interrogator. The identification code is transmitted by the transponder through the use of frequency shift keying modulation. The circuit according to this invention features low battery current draw during the normally unenergized condition and further provides a battery voltage monitoring circuit.

15 Claims, 1 Drawing Sheet

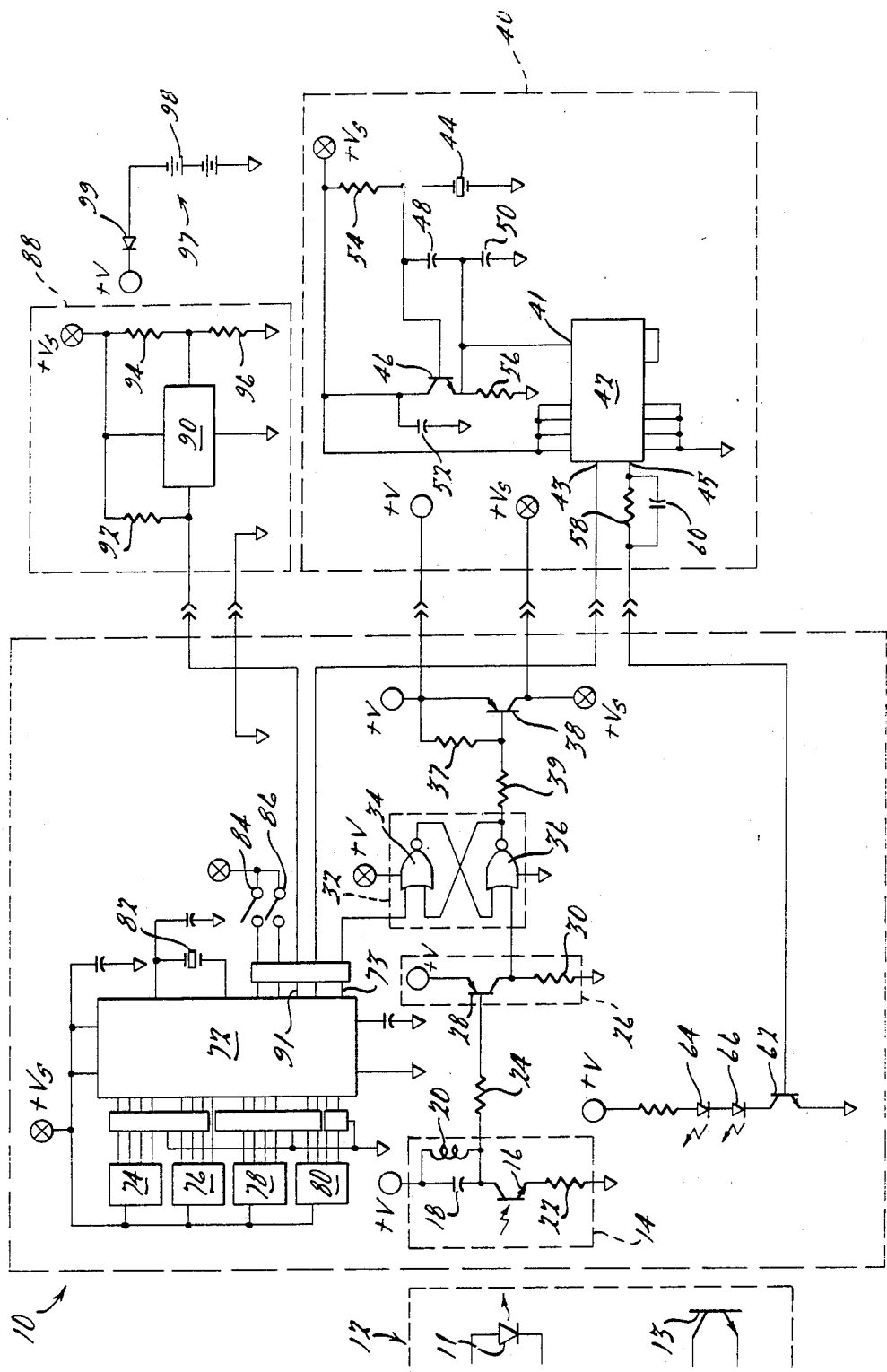

INDUSTRIAL IDENTIFICATION TRANSPONDER

BACKGROUND AND SUMMARY OF THE INVENTION

This invention relates to a digital communication device, and particularly, to one useful for providing a coded number or word for identifying a mobile article.

In manufacturing facilities employing so-called flexible machining systems, mobile pallets are used to automatically transport workpieces between work stations. In such facilities, it is frequently desirable for the pallets to be identified by the work station so that the machine operating on the workpiece can execute stored instructions for carrying out desired steps for a particular workpiece or type of workpiece, Such an identification feature would also be useful for material control purposes even when each workpiece is to be processed in identical fashion. A preferred system for identifying pallets or other articles would avoid the use of electrical contacts between the work station and the mobile device since such systems are subject to reliability problems. Since the pallets or other mobile articles are designed to be completely self-contained, it is further desirable to operate such an identification system using low power electrical supply sources such as storage batteries.

In accordance with this invention, a digitally operated identification transponder is provided which is adapted to travel on a mobile device such as a pallet which responds to a flash of light transmitted by an interrogator device. The signal from the interrogator causes the transponder to repeatedly transmit a stored identification code using light pulses which are received and interpreted by the interrogator device. The transponder provides a binary identification digital word which can be reprogrammed as desired. The transponder in accordance with this invention employs means for preventing ambient light from being interpreted as an interrogating signal and is further designed to minimize battery current drain when not operating to provide an identification signal. The system further incorporates a battery checking system and means for communicating a signal indicating low battery voltage.

Additional benefits and advantages of the present invention will become apparent to those skilled in the art to which this invention relates from the subsequent description of the preferred embodiments and the appended claims, taken in conjunction with the accompanying drawing.

BRIEF DESCRIPTION OF THE DRAWING

FIG. 1 is an electrical schematic diagram showing individual components of the industrial identification transponder and interrogator in accordance with this invention.

DETAILED DESCRIPTION OF THE INVENTION

The industrial identification transponder according to this invention is generally designated by reference character 10 and is designed to be used in conjunction with interrogator 12. Interrogator device 12 is affixed to a structure such as a machine tool and is adapted to initiate operation of identification transponder 10. Interrogator 12 includes an LED light source 11 or a Xenon flash tube (for longer range) which have a characteristic rapid rise time. Interrogator 12 also includes phototransistor 13 for receiving digitally encoded light transmitted identification signals from transponder 10.

The various components of interrogator 12 are shown in detail in the Figure. A light flash from interrogator LED 11 is received by receiver network 14. Network 14 includes phototransistor 16 which is coupled to capacitor 18 and inductor 20. Resistors 22 and 24 are provided as current limiters. When phototransistor 16 receives a flash of light from interrogator LED 11, a change in voltage across inductor coil 20 occurs which, with capacitor 18, causes a damped oscillation to occur if the rise time of the received light is sufficiently rapid. Transponder 10 is designed to respond only to a rapid rise time flash in order to prevent ambient light inputs such as conventional artificial lighting received by phototransistor 16 from initiating operation of the transponder.

A signal from receiver network 14 is transmitted to amplifier network 26 which includes transistor 28 and resistor 30. Amplifier network 26 is provided to amplify the signal from receiver network 14.

Flip-flop network 32 receives an input signal from amplifier network 26 and is comprised of a pair of NOR gates 34 and 36 which are cross coupled to provide a resettable latch. A set or reset signal is provided to NOR gate 34 from additional elements of this circuit which will be described below. When flip-flop 32 is reset by an appropriate input to NOR gate 34, an output is provided in response to a transient signal from amplifier network 26 to NOR gate 36. A set signal to NOR gate 34 holds the output of flip-flop 32 in a given state for a desired period of time. An output from flip-flop 32 is provided to driver transistor 38 which connects power supply voltage designated as V to a switched circuit supply voltage identified as $V_s$. Resistors 37 and 39 and provided for proper biasing of driver transistor 38. The above circuit elements combine to provide a signal which initiates operation of the remaining components of transponder 10 when the proper interrogation signal is sensed and when the circuit is in a ready state.

Frequency shift keying network 40 includes IC counter 42 which receives an external clock signal from crystal oscillator 44. The output of crystal 44 is coupled to transistor 46, capacitors 48, 50 and 52 and resistors 54 and 56, and is inputted to counter 42 at input 41. Crystal oscillator 44 produces a pulsed output with a frequency which is many times greater than the desired modulation frequency of the system. Preferably, crystal oscillator 44 produces a frequency output in the 1.8 to 3.5 MHz range. An input 43 to IC counter 42 is keyed to cause the counter to produce a frequency modulated signal at output 45 which is either the fundamental frequency produced by oscillator 44 divided by a first number, or the fundamental frequency divided by a second number. For example, depending on the state of input 43, the crystal oscillator 44 output may be divded by either 12 or 13. The output from counter 42 is transmitted through resistor 58 and capacitor 60 to LED driver transistor 62 which drives a pair of LEDs 64 and 66 which preferably operate in the infrared range. In operaiton once $V_s$ power becomes available, frequency shift keying network 40 is energized and crystal 44 begins to oscillate. Depending on the stae of counter input 43, an output is provided of a desired frequency, and this output drives LEDs 64 and 66 to produce a pulsed light output.

Microcomputer 72 is provided which includes a microprocessor, EPROM, RAM, and input/output elements. Microcompuer IC 72 provides a digital control signal which changes the state of input 43 of IC counter 42 to provide the desired frequency output, thereby providing a frequency shift keyed identification code. Microcomputer 72 receives data input signals from four switch packages 74, 76, 78 and 80, each having four individual binary switching elements such that each provides a four-bit hexadecimal character (this data could also be provided by CMOS memory or latch chips). External crystal clock 82 provides timing signals for microcomputer 72. Two data input switches 84 and 86 provide signals which adjust the band rate of the output of microcomputer 72. An output 73 from microcomputer 72 provides a resetting input for NOR gate 36. By controlling setting and resetting of flip-flop network 32, operation of frequency shift keying network 40 continues until the operating cycle controlled by microcompuer 72 is completed.

Switches 74 through 80 are set to a desired hexidecimal identification code word. When the system is energized, $V_s$ power is supplied to microcompuer 72 which provides a serial output in the form of a sequence of binary characters which are read from switches 74 thorugh 80. This binary signal is supplied to IC counter input 43 and toggles the counter IC to provide output pulses at either a first or second selected frequency. This operation provides the frequency shift keying described previously. Since microcompuer 72 is energized intermittently, its operating program must be stored by non-volatile means such as ROM buttble memories, etc.

As an additional feature, identificaiton transponder 1includes battery checking circuit 88 which includes battery checking IC 90 connected to resistors 92, 94 and 96 which provides a signal in response to the level of voltage available from power source $V_s$. When the supply voltage falls below a predetermined value, a signal is provided to microcomputer 72 interrup input 91 causing the micrcomputer to execute internally stored instructions which preferably provide a binary coded message to interrogator 12 indicating the low battery voltage condition. Power supply 97 provides supply voltage V for transponder 12 and includes batteries 98, preferably lithium types, and diode 99.

The transponder 10 in accordance with this invention preserves battery 98 supply voltage since IC counter 42, microcompuer 72 and transistors 16 and 28 are not energized during periods when identification information is not being transmitted.

The following table provides specifications for various electronic components employed in connection with this invention which have been round to perform satisfactorily.

| Component Name | Reference Number | Manufacturer | Part No. |
| --- | --- | --- | --- |
| Microcomputer | 72 | Motorola | MC68705P3L |
| Battery Checking IC | 90 | Interset | ICL8211 |
| Counter IC | 42 | Motorola | MC4526P |
| Flip-Flop Network | 32 | National Semiconductor | 74HC02 |
| LED | 64 | TRW | OP-20 |
| LED | 66 | TRW | OP-20 |
| Phototransistor | 16 | Vactec | VTT-3321 |
| Transistor | 46 | (generic) | 2N4401 |
| LED Driver Transistor | 62 | (generic) | 2N4401 |

-continued

| Component Name | Reference Number | Manufacturer | Part No. |
| --- | --- | --- | --- |
| Transistor | 28 | (generic) | 2N4402 |

While the above description constitutes the preferred embodiments of the present invention, it will be appreciated that the invention is susceptible to modification, variation and change without departing from the proper scope and fair meaning of the accompanying claims.

What is claimed is:

1. An identification system comprising:
    an interrogator including flash means having a flash tube for generating an interrogation signal in the form of a flash of light having a rapid rise time, said interrogator further including optical receiver means for receiving optical information; and
    a transponder including circuit means for generating a turn-on signal in response to the flash of light from the interrogator while being substantially unresponsive to other light sources, the transponder further including user programmable code generator means for selecting and transmitting a preselected optical code to the interrogator, the code generator means further being operable to cease the transmission of the preselected optical code at a peselected time, a battery, and battery control means for coupling power from the battery to the code generator means to initiate transmission of said optical code in response to said turn-on signal being generated to a result of the flash from the interrogator.

2. The system of claim 1 wherein said code generator means comprises:
    frequency shift keying means having an input and an output, adapted to generate at least two different frequencies at its output as a function of data applied to said input;
    microprocessor means having a stored program therein for generating a preselected digital code, said microprocessor means having an output coupled to the input of said frequency shift keying network; and
    optical transmission means coupled to the output of said frequency shift keying network whereby said optical transmission means is driven at frequencies defined by the code from the microprocesor means.

3. An identification system comprising:
    an interrogator including flash means for generating an interrogation signal in the form of a flash of light having a rapid rise time, said interrogator further including optical receiver means for receiving optical information; a transponder including circuit means having a photoreceptor coupled to an inductor for generating a turn-on signal in response to the flash of light from the interrogator while being substantially unresponsive to other light sources; said transponder further including code generator means for transmitting a preselected optical code to the interrogator, a battery and battery control means for coupling power from the battery to said code generator means, whereby transmission of said optical code is initiated in response to said turn-on signal being generated as a result of the flash from the interrogator; said code generator means including a frequency shift keying means having an input and an output, adapted to generate at least two different frequencies at it output as a function of data applied to said input; microprocessor means having a stored program therein for generating a preselected digital code, said microprocessor means having an output coupled to the input of said frequency shift keying network; and said code generator means further including optical transmission means coupled to the output of said frequency shift keying network, said optical transmission means being driven at frequencies defined by the code from said microprocessor means.

4. The system of claim 3 wherein said battery control means comprises:
a latch circuit having at least one settable gate, with said turn-on signal initially setting said gate to a given state, and wherein said microprocesor means continued to maintain said gate in said given state for a preselected period of time to enable transmission of said code.

5. The system of claim 3 which further comprises:
battery checking circuit means for monitoring the voltgae of said battery and providing a signal to said microprocessor means when the battery voltage falls below a predetermined level, with said microprocessor means supplying a low battery signal to the frequency shift keying network in response thereto whereby the interrogator can be informed of a low battery condition.

6. The system of claim 3 wherein said microprocessor means further comprises:
read/write memory means for programming said code.

7. The system of claim 3 wherein said flash from the interrogator and the optical transmission from the transponder are in the infrared frequency spectrum.

8. The system of claim 3 which further comprises a plurality of code selecting switches coupled to said microprocessor means for defining said code.

9. A method of identifying a device comprising:
mounting a battery operated transponder onto the device, said transponder including battery control means for selectively coupling power from the battery to user programmable microprocessor controlled code generating circuitry;
setting at least one switching device to program a selected code;
energizing a flash tube to transmit a flash of infrared light from an interrogator to the transponder;
employing circuit means for detecting light having a predetermined rapid rise time to thereby distinguish the flash of light from other light sources, and using the battery control means to couple power from the battery to the microprocessor controlled code generating circuitry in response to the detection by the circuit means of the flash of light;
transmitting said selected code from the microprocessor controlled code generating circuitry in response to the application of battery power for a predetermined period of time; and
ceasing further transmission in response to a signal from the microprocessor controlled code generating means, whereby power from the battery is decoupled until another flash of light from the interrogator is detected.

10. The method of claim 9 which comprises;
optically transmitting said code to the interrogator.

11. The method of claim 9 which comprises;
shifting frequencies of a modulating signal to an optical device for transmitting said code.

12. A method of identifying a device comprising:
mounting a battery operated transponder onto the device, said transponder further comprising battery control means for selectively coupling power from the battery to a user programmable microprocessor controlled code generating circuitry;
programming a selected code by manually setting switches coupled to the microprocessor;
transmitting a flash of infrared light from an interrogator to said transponder;
distinguishing the flash of light from other light sources and generating a momentary turn-on signal in response thereto;
using the battery control means to couple power form the battery to the code generating means in response to said momentary turn-on signal, said code generating means being operative to shift frequencies of a modulating signal to an optical device to produce said selected code;
using the microprocessor controlled code generating circuitry to selectively sustain battery power for a predetermined period of time;
programming a selected code;
transmitting the code from the optical device in response to the application of battery power for the predetermined period of time; and
ceasing further transmission until another flash of light is detected.

13. The method of claim 12 wherein a capacitor and an inductor coupled to a photoreceptor are utilized to generate a damped, oscillating turn-on input signal in response to the detection of light having a predetermined rapid rise time by a photoreceptor device, with the input signal being sufficient to at least momentarily cause conduction of current from the battery through a transistor to the code generating means.

14. A method of identifying a device comprising:
mounting a battery-operated, microprocessor controlled transponder onto the device, the transponder including battery control means for selectively coupling and decoupling power to and from the battery to user programmable code generating circuitry;
programming a selected code;
transmitting a flash of infrared light from an interrogator to the transponder;
employing circuit means for detecting light having a predetermined rapid rise time to thereby distinguish the flash of light from other light sources, and using the battery control means to couple power from the battery to the code generating circuitry in response to the detection by the circuit means of the flash of light;
utilizing the code generating circuitry to shift frequencies of a modulating signal to an optical device for transmission of said selected code for a predetermined period of time in response to the application of battery power; and
ceasing further transmission in response to a signal from the code generator circuitry until another flahsh of light is detected.

15. An identification system comprising:
an interrogator including flash means for generating an interrogation signal in the form of a flash of light having a rapid rise time, the interrogator further including optical receiver means for receiving optical information; and a transponder including circuit means for generating a turn-on signal in response to the flash of light from the interrogator while being substantially unresponsive to other light sources, the transponder further including code generator means having a frequency shift keying means, the frequency shift keying means further having an input and an output, adapted to generate at least two different frequencies at the oupt as a function of data supplied to the input. and the code generator means further including microprocessor means, the microproessor means having a stored program therein for generating a preselected digital code and an output coupled to the input of the frequency shift keying network, and optical transmission means coupled to the output of the frequency shift keying network whereby the optical transmission means is driven at frequencies defined by the code from the microprocessor means.

* * * * *